Jan. 20, 1948.  K. A. HERRINGTON  2,434,766
DIRIGIBLE HEADLIGHT STRUCTURE
Filed Feb. 16, 1945  2 Sheets-Sheet 1
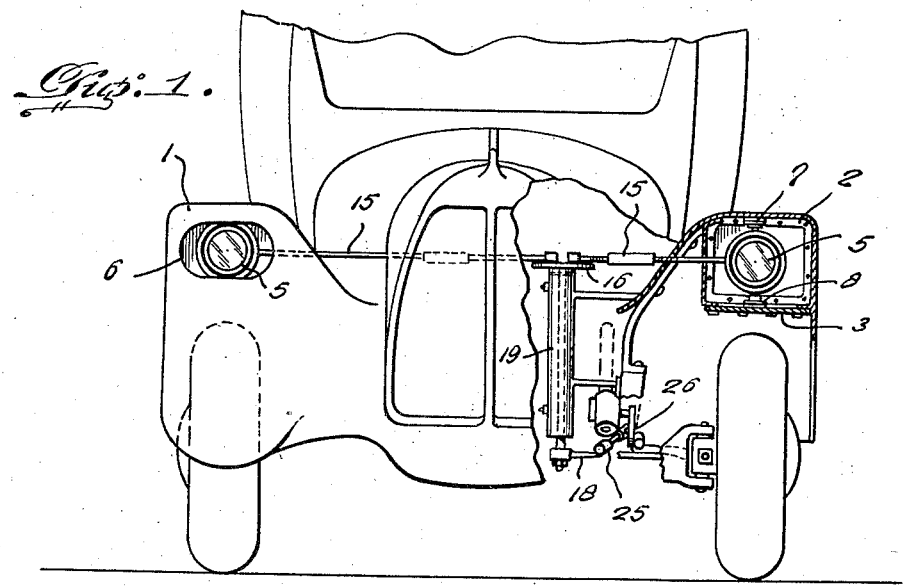
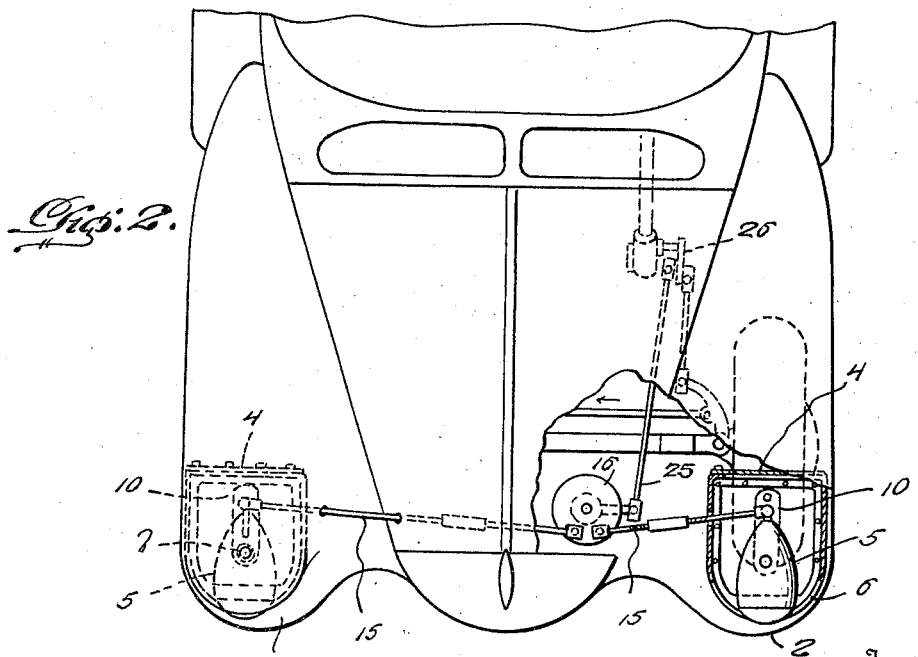
Inventor
Kurb A. Herrington,
Attorneys

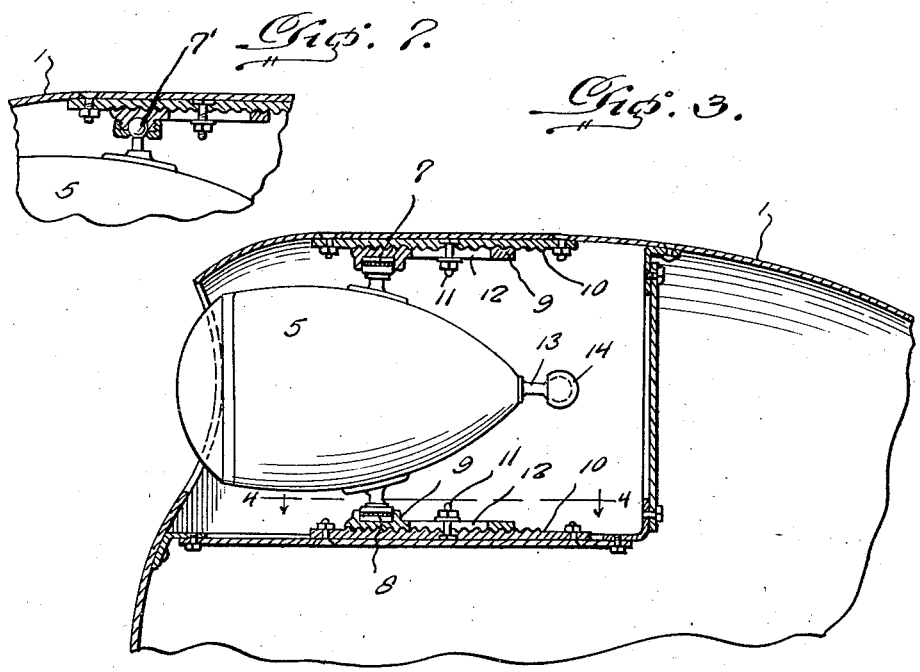
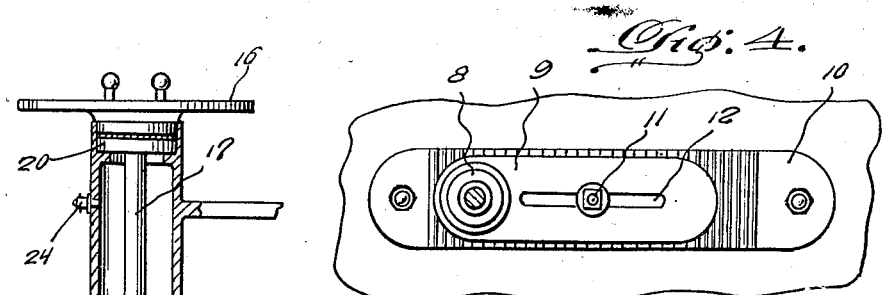
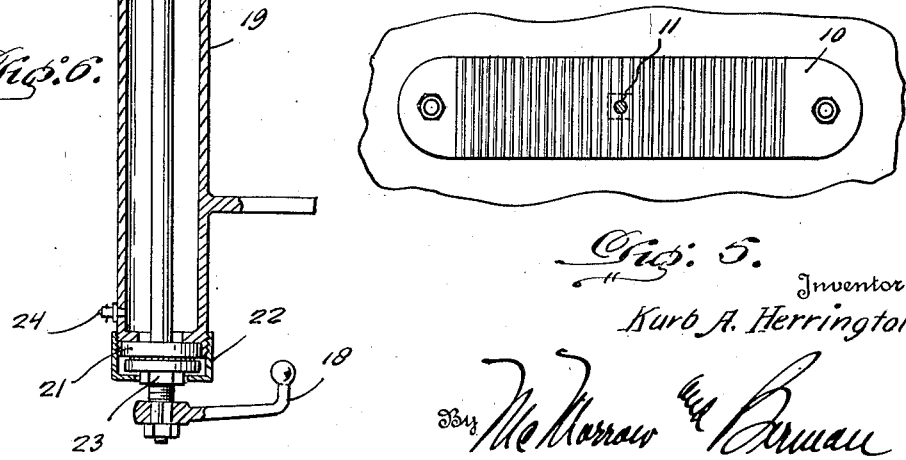

Patented Jan. 20, 1948

2,434,766

UNITED STATES PATENT OFFICE 2,434,766

DIRIGIBLE HEADLIGHT STRUCTURE

Kurb A. Herrington, Chicago, Ill.

Application February 16, 1945, Serial No. 578,152

1 Claim. (Cl. 240—62.52)

This invention relates to dirigible headlights, and more particularly to automatically adjustable headlights for automobiles and the like.

A main object of this invention is to provide a structure forming an integral part of a vehicle such as an automobile so arranged that the forward path of movement of the vehicle will constantly be illuminated, especially when rounding curves or corners so that the operator of the vehicle can clearly see the roadway at all times.

A further object of this invention is to provide a dirigible headlight structure built into and housed by the front fenders of an automobile with adjusting means provided for properly positioning the headlight elements to insure the maximum efficiency of road illumination.

Further objects of this invention will become apparent from the following description and claim, and from the accompanying drawings, wherein:

Figure 1 is a front elevational view, with portions broken away, of an automobile equipped with the dirigible headlight structure of this invention.

Figure 2 is a plan view, with portions broken away, of the forward portion of the automobile of Figure 1.

Figure 3 is a detail view in longitudinal cross-section of a portion of a front fender of the automobile of Figure 1, showing the headlight structure and adjusting means therefor.

Figure 4 is a sectional view taken on line 4—4 of Figure 3.

Figure 5 is a detail view in plan of an adjoining plate for supporting the headlight of Figure 4, with the adjustment securing screw thereof shown in cross-section.

Figure 6 is a detail view in vertical section of a lubricated bearing member forming part of the structure of Figure 1.

Figure 7 is a fragmentary vertical sectional view, illustrating a modified form of mounting for the headlight.

Referring to the drawings, 1 and 2 designate the front fenders of an automobile equipped with the headlight structure of this invention. Each fender is provided with an inner wall member 3 and a rear wall member 4 forming a housing for a headlight element 5. The front portion of each fender is provided with a horizontally elongated opening 6 adapted to allow passage of the headlight beam and providing clearance for substantial angular movement of the front portion of the headlight which projects through said opening.

Each headlight 5 is pivotally supported in its housing by an upper bearing 7 and a lower bearing 8, the pivotal axis of bearings 7 and 8 being substantially in vertical alignment. Each bearing is supported and retained in assembled condition by a seat member 9 which is longitudinally elongated and is provided with a serrated outer surface, adapted to engage with a correspondingly serrated plate member 10 secured to the top wall of the fender in the case of the upper bearing and to the bottom wall of the housing for the lower bearing. The respective seat members 9 may be adjustably positioned on the respective plate members 10 and secured in adjustment by bolts 11 extending through the plate members 10 and through longitudinal slots 12 provided in the seat members 9. The headlight elements 5 may thus be longitudinally adjusted to desired positions in their housings.

Each headlight element 5 is provided with a rear extension 13 connected by a ball and socket joint 14 to an adjustable tie rod 15 passing through the inner side wall of the headlight housing. The respective tie rods 15 are pivotally and eccentrically connected at their inner ends to a horizontal disc member 16. Said disc member is secured at its center to the upper end of a vertical shaft 17, the lower end of said shaft 17 being provided with an actuating arm 18 keyed thereto. A lubricant sleeve 19, secured to the chassis of the automobile, surrounds the intermediate portion of shaft 17 and supports said disc and shaft for free rotation by an upper bearing assembly 20 and a lower bearing assembly 21. Upper bearing 20 is received in an appropriate upper cup-shaped recess formed at the top end of sleeve 19 and lower bearing element 21 is received in a similar cup-shaped recess at the lower end of said sleeve. A cap member 22, threadedly engaged with the lower outer portion of sleeve 19, substantially covers lower bearing 21. The bearings 20 and 21 are securely held in their seats by a nut 23 threaded on the lower portion of shaft 17 and adapted to be tightened to remove any looseness in the bearings. Appropriate grease fittings 24 are provided for filling sleeve 19 with lubricant.

Actuating arm 18 is connected by a link 25 to an intermediate point on the main pitman arm 26 which controls the steering gear linkage responsive to actuation of the steering wheel of the automobile. The length of the various linkage elements for directing the headlights are proportioned so that rotation of the headlights is substantially synchronized with rotation of the front wheels responsive to actuation of the steering wheel. Turnbuckle elements on each tie rod 15 provide for fine adjustments to obtain exact synchronization.

The complete lubrication of the bearings for disc shaft 17 afforded by the lubricant filled sleeve 19 provides a high degree of sensitivity to the movement of main pitman arm 26, so that very little lost motion occurs between the movement of said pitman arm 26 and the rotation of disc 16, which is transmitted by tie rods 15 to the headlights 5. Said headlights 5 will therefore accurately follow the direction of the front wheels and constantly illuminate the roadway in advance of the automobile.

Each headlight may be mounted on the seat members 9 by ball and socket joints 7' instead of by the bearings 7 and 8.

While a specific embodiment of a dirigible headlight structure has been disclosed in the foregoing description, it will be understood that various modifications within the spirit of the invention will occur to those skilled in the art. Therefore, it is intended that no limitations be placed on the invention other than as defined by the scope of the appended claim.

What is claimed is:

A dirigible headlight for motor vehicles comprising a housing structure under the forward portion of each front fender of the vehicle, stationary toothed plates secured in the top and bottom of the housing, seat members having toothed surfaces secured against the toothed plates for longitudinal adjustment in the housing, a headlight element mounted at its top and bottom portions on said seat members for horizontal swinging movement, and means operatively connecting the headlight elements to the steering mechanism of the vehicle.

KURB A. HERRINGTON.

REFERENCES CITED

The following references are of record in the file of this patent:

UNITED STATES PATENTS

| Number | Name | Date |
|---|---|---|
| 1,037,816 | Andersen | Sept. 3, 1912 |
| 1,297,543 | Chick | Mar. 18, 1919 |
| 1,527,253 | Gray | Feb. 24, 1925 |
| 1,629,752 | Wentworth | May 24, 1927 |
| 1,821,220 | Krick | Sept. 1, 1931 |
| 1,186,914 | Krumbein | June 13, 1916 |
| 1,512,504 | Solosabal | Oct. 21, 1924 |
| 1,963,608 | Baker | June 19, 1934 |
| 2,281,643 | Wahlberg | May 5, 1942 |

FOREIGN PATENTS

| Number | Country | Date |
|---|---|---|
| 482,816 | Great Britain | 1938 |